(12) United States Patent
Gohda et al.

(10) Patent No.: US 8,549,421 B2
(45) Date of Patent: Oct. 1, 2013

(54) APPARATUS AND METHOD FOR MANAGING CONTENT

(75) Inventors: Makoto Gohda, Tokyo (JP); Hideaki Tsuruishi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 606 days.

(21) Appl. No.: 12/467,522

(22) Filed: May 18, 2009

(65) Prior Publication Data

US 2009/0288028 A1 Nov. 19, 2009

(30) Foreign Application Priority Data

May 19, 2008 (JP) .................................. 2008-130759

(51) Int. Cl.
*G06F 3/0482* (2013.01)

(52) U.S. Cl.
USPC ........... 715/769; 715/764; 715/810; 715/788; 713/165; 713/168; 345/661; 345/665; 345/666

(58) Field of Classification Search
USPC ......................................................... 715/769
See application file for complete search history.

(56) References Cited

U.S. PATENT DOCUMENTS

| | | | | |
|---|---|---|---|---|
| 5,499,040 A | * | 3/1996 | McLaughlin et al. | 715/823 |
| 5,721,853 A | * | 2/1998 | Smith | 715/803 |
| 5,729,734 A | * | 3/1998 | Parker et al. | 1/1 |
| 5,745,714 A | * | 4/1998 | Glass et al. | 715/788 |
| 6,097,389 A | * | 8/2000 | Morris et al. | 715/804 |
| 6,137,897 A | * | 10/2000 | Emi et al. | 382/128 |
| 6,275,935 B1 | * | 8/2001 | Barlow et al. | 713/182 |
| 6,606,105 B1 | * | 8/2003 | Quartetti | 715/853 |
| 6,629,104 B1 | * | 9/2003 | Parulski et al. | 382/307 |
| 6,813,618 B1 | * | 11/2004 | Loui et al. | 1/1 |
| 7,086,000 B2 | * | 8/2006 | LaMarca et al. | 715/234 |
| 7,171,113 B2 | * | 1/2007 | Parulski et al. | 396/287 |
| 7,542,994 B2 | * | 6/2009 | Anderson | 1/1 |
| 7,710,439 B2 | * | 5/2010 | Reid et al. | 345/660 |
| 7,730,012 B2 | * | 6/2010 | Arrouye et al. | 1/1 |
| 7,734,568 B2 | * | 6/2010 | Polson et al. | 1/1 |
| 7,822,746 B2 | * | 10/2010 | Svendsen | 707/736 |
| 7,949,206 B2 | * | 5/2011 | Itogawa et al. | 382/305 |

(Continued)

FOREIGN PATENT DOCUMENTS

| | | | | |
|---|---|---|---|---|
| EP | 339220 A2 | * | 11/1989 | G06F 9/44 |
| EP | 0864988 | * | 6/1998 | |
| EP | 864988 A1 | * | 9/1998 | G06F 17/24 |
| JP | 11-203276 A | | 7/1999 | |

OTHER PUBLICATIONS

Adobe Photoshop album starter 3.0, Adobe, released on Jun. 7, 2005, screenshot of working program, pp. 1-8.*

*Primary Examiner* — William Bashore
*Assistant Examiner* — Reza Nabi
(74) *Attorney, Agent, or Firm* — Canon USA Inc. IP Division

(57) ABSTRACT

A content management apparatus displays, on a display unit, a first display object representing a content item, at least one area for including the first display object, and a second display object used for setting a condition regarding movement of the first display object into the area or from the area. When the first display object is moved into the area, the first object is contained in the area and, when the second display object is moved into the area, a condition regarding movement of the first display object into the area or from the area displayed on the display unit is set.

15 Claims, 13 Drawing Sheets

(56) References Cited

U.S. PATENT DOCUMENTS

| | | | |
|---|---|---|---|
| 2002/0065844 A1* | 5/2002 | Robinson et al. | 707/500 |
| 2003/0023459 A1* | 1/2003 | Shipon | 705/2 |
| 2003/0039410 A1* | 2/2003 | Beeman et al. | 382/305 |
| 2003/0115458 A1* | 6/2003 | Song | 713/165 |
| 2004/0135815 A1* | 7/2004 | Browne et al. | 345/810 |
| 2005/0050043 A1* | 3/2005 | Pyhalammi et al. | 707/6 |
| 2006/0184673 A1* | 8/2006 | Liebman | 709/225 |
| 2008/0177994 A1* | 7/2008 | Mayer | 713/2 |
| 2008/0292196 A1* | 11/2008 | Jain et al. | 382/225 |
| 2009/0125560 A1* | 5/2009 | Munekuni et al. | 707/104.1 |
| 2009/0171695 A1* | 7/2009 | Cobbinah et al. | 705/3 |
| 2009/0319472 A1* | 12/2009 | Jain et al. | 707/2 |
| 2009/0324137 A1* | 12/2009 | Stallings et al. | 382/306 |
| 2010/0157096 A1* | 6/2010 | Park et al. | 348/231.3 |
| 2010/0318510 A1* | 12/2010 | Ryu | 707/722 |
| 2011/0047517 A1* | 2/2011 | Lee et al. | 715/863 |
| 2011/0105193 A1* | 5/2011 | Lee et al. | 455/566 |

* cited by examiner

FIG. 5

| iID | FILE NAME | PATH | DISPLAY INFORMATION | GROUP INFORMATION (gID) |
|---|---|---|---|---|
| ... | ... | ... | ... | ... |
| 003 | IMG_0003.JPG | My Picture\2007\07\07\IMG_0003.JPG | UPPER LEFT (596, 685) LOWER RIGHT (700, 66) OVERLAY 1,...etc | 002 |
| ... | ... | ... | ... | ... |

| mID (IMAGE PROPERTY TAG ID) | IMAGE PROPERTY NAME | DISPLAY INFORMATION |
|---|---|---|
| ⋮ | ⋮ | ⋮ |
| 02 | MOM | (800, 740)··· |
| 03 | DADDY | (800, 700)··· |
| ⋮ | ⋮ | ⋮ |

| fID (FUNCTION PROPERTY TAG ID) | FUNCTION PROPERTY NAME | DISPLAY INFORMATION |
|---|---|---|
| ⋮ | ⋮ | ⋮ |
| 02 | CLASSIFICATION LOCK | (800, 820)··· |
| 03 | TAG LOCK | (800, 840)··· |
| ⋮ | ⋮ | ⋮ |

701 702 703

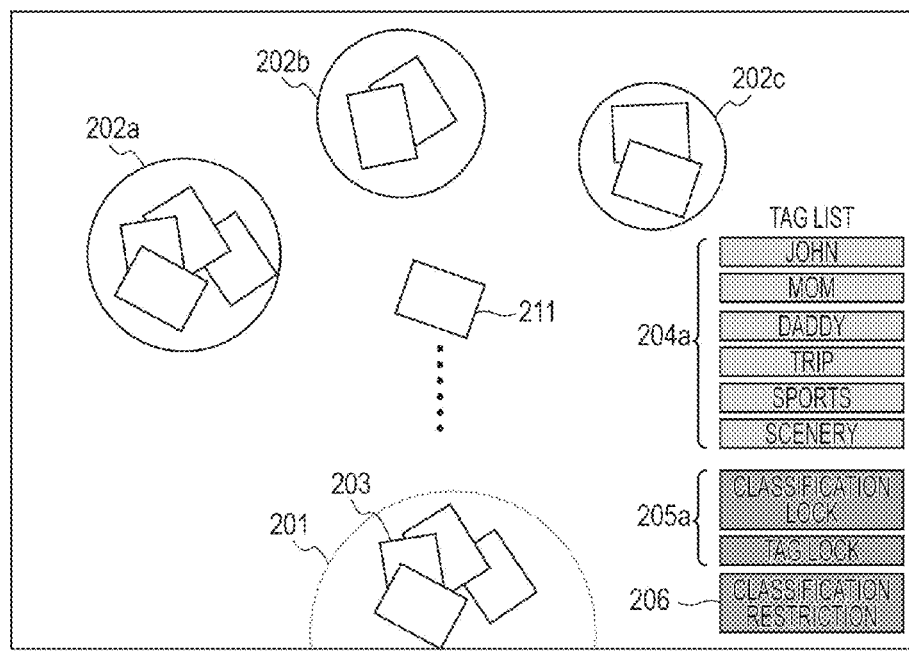
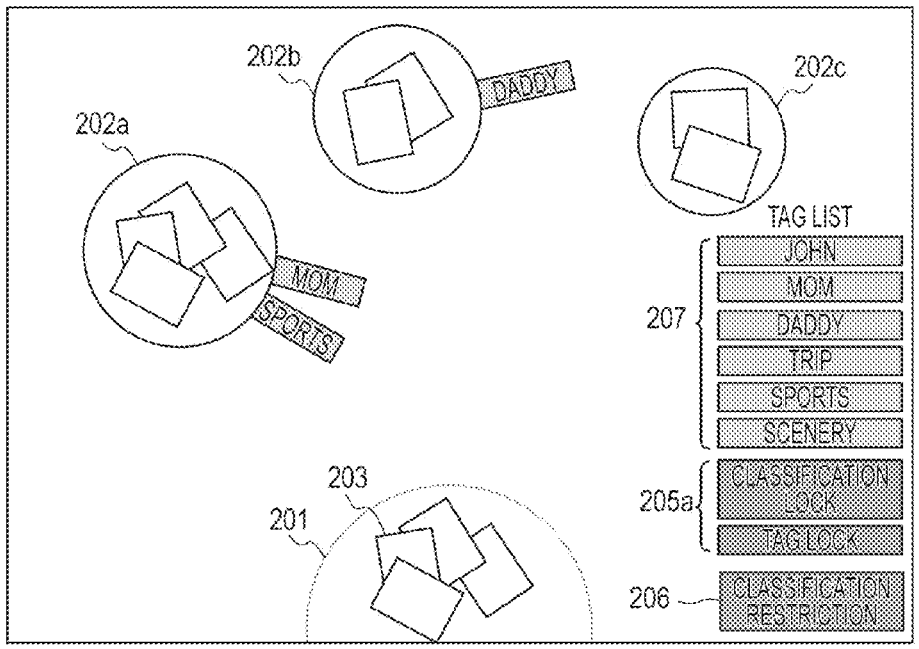

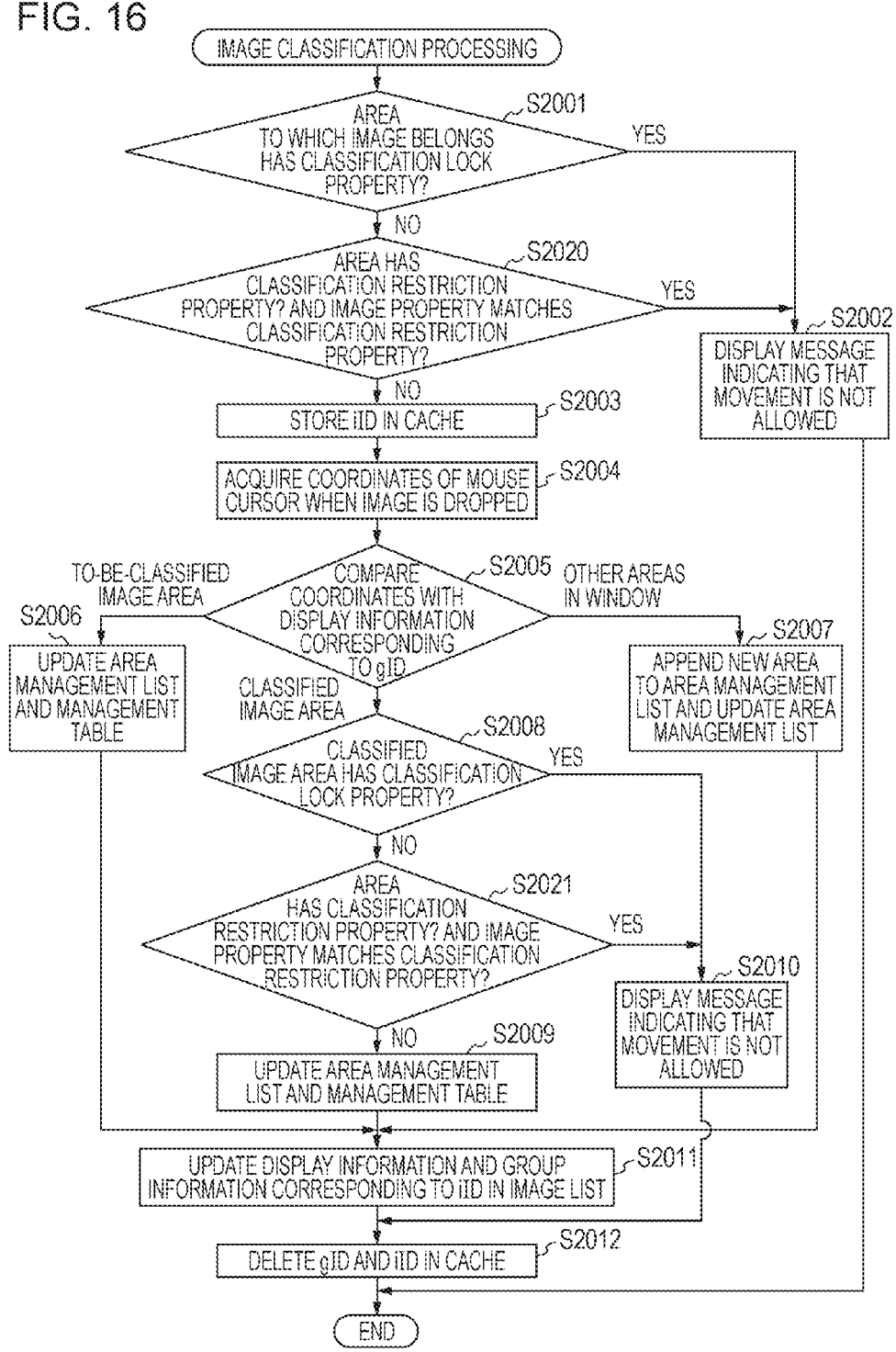

APPARATUS AND METHOD FOR MANAGING CONTENT

BACKGROUND OF THE INVENTION

1. Field of the Invention

The present invention relates to a content management apparatus and a content management method for displaying and managing digital content, a program for causing a computer to execute the method, and a storage medium for storing the program.

2. Description of the Related Art

In order to manage digital content items, existing content management apparatuses classify the digital content items into predetermined areas, attach additional information to the digital content items, and search for a desired content item using the attached additional information.

For example, in widely used content management apparatuses, such as personal computers (PCs), content files are organized and managed using a layer structure called a "folder". In general, a file is stored in a folder by dragging and dropping a display object representing the file in a display object representing the folder. In addition, by displaying the properties of each of folders and checking a checkbox for attaching a corresponding property, that property can be attached to the folder. Through such an operation, properties, such as "read only", "hidden folder", and access right of the folder, can be attached to the folder.

In addition, Japanese Patent Laid-Open No. 11-203276 describes the following technique. A user strips off a tag sheet from a tag sheet group and attaches the stripped tag sheet to a desired page of a desired electronic document (a desired content item) by dragging and dropping the tag sheet. In this way, the property for identifying the electronic document can be attached. Furthermore, the user can select one of tag sheet groups and refer to the information regarding the tag sheet group. Thus, the user can search for all of the tag sheets stripped from the tag sheet group.

However, in the above-described existing techniques, the operations for managing content items are performed through different operation methods. Therefore, a user needs to be familiar with a variety of operation methods. Accordingly, in particular, it is difficult and troublesome for beginners who are unfamiliar with PC operations to classify content items in a content management apparatus.

SUMMARY OF THE INVENTION

The present invention provides a content management apparatus for providing users with a unified operation method so that the users can intuitively perform different operations regarding classification of content items.

According to an embodiment of the present invention, a content management apparatus includes a display control unit configured to perform control so that a first display object representing a content item, an area that contains the first display object, and a second display object used for setting a condition regarding movement of the first display object into the area or from the area are displayed on a display unit, an instruction receiving unit configured to receive an instruction instructing movement of the first display object and the second display object on the display unit, and a control unit configured to perform control so that, when the first display object is moved into the area in response to the instruction received by the instruction receiving unit, the first object is contained in the area and, when the second display object is moved into the area in response to the instruction received by the instruction receiving unit, a condition regarding movement of the first display object into the area or from the area displayed on the display unit is set.

According to another embodiment of the present invention, a method for managing content is provided. The method includes performing control so that a first display object representing a content item, an area that contains the first display object, and a second display object used for setting a condition regarding movement of the first display object into the area or from the area are displayed on a display unit, receiving an instruction instructing movement of the first display object and the second display object on the display unit, and performing control so that, when the first display object is moved into the area in response to the instruction received in the step of receiving an instruction, the first object is contained in the area and, when the second display object is moved into the area in response to the instruction received in the step of receiving an instruction, a condition regarding movement of the first display object into the area or from the area displayed on the display unit is set.

According to still another embodiment of the present invention, a computer-readable recording medium is provided. The recording medium stores a program for causing a computer to function as a display control unit configured to perform control so that a first display object representing a content item, an area that contains the first display object, and a second display object used for setting a condition regarding movement of the first display object into the area or from the area are displayed on a display unit, an instruction receiving unit configured to receive an instruction instructing movement of the first display object and the second display object on the display unit, and a control unit configured to perform control so that, when the first display object is moved into the area in response to the instruction received by the instruction receiving unit, the first object is contained in the area and, when the second display object is moved into the area in response to the instruction received by the instruction receiving unit, a condition regarding movement of the first display object into the area or from the area displayed on the display unit is set.

According to yet still another embodiment of the present invention, a content management apparatus includes a display control unit configured to perform control so that a first display object representing a content item, an area that contains the first display object, a third display object for indicating processing to be performed on the content item corresponding to the first display object, and a fourth display object for setting a condition regarding movement of the third display object into the area or from the area are displayed on a display unit, an instruction receiving unit configured to receive an instruction instructing movement of one of the first display object, the third display object, and the fourth display object on the display unit, and a control unit configured to perform control so that, when the first display object is moved into the area in response to the instruction received by the instruction receiving unit, the first object is contained in the area and, when the third display object is moved into the area in response to the instruction received by the instruction receiving unit, the processing is performed on a content item corresponding to the first display object contained in the area, and, when the fourth display object is moved into the area in response to the instruction received by the instruction receiving unit, a condition regarding movement of the third display object into the area or from the area displayed on the display unit is set.

According to yet still another embodiment of the present invention, a method for managing content is provided. The method includes performing control so that a first display object representing a content item, an area that contains the first display object, a third display object for indicating processing to be performed on the content item corresponding to the first display object, and a fourth display object for setting a condition regarding movement of the third display object into the area or from the area are displayed on a display unit, receiving an instruction instructing movement of one of the first display object, the third display object, and the fourth display object on the display unit, and performing control so that, when the first display object is moved into the area in response to the instruction received in the step of receiving an instruction, the first object is contained in the area and, when the third display object is moved into the area in response to the instruction received in the step of receiving an instruction, the processing is performed on a content item corresponding to the first display object contained in the area, and, when the fourth display object is moved into the area in response to the instruction received in the step of receiving an instruction, a condition regarding movement of the third display object into the area or from the area displayed on the display unit is set.

According to yet still another embodiment of the present invention, a computer-readable recording medium is provided. The recording medium stores a program for causing a computer to function as a display control unit configured to perform control so that a first display object representing a content item, an area that contains the first display object, a third display object for indicating processing to be performed on the content item corresponding to the first display object, and a fourth display object for setting a condition regarding movement of the third display object into the area or from the area are displayed on a display unit, an instruction receiving unit configured to receive an instruction instructing movement of one of the first display object, the third display object, and the fourth display object on the display unit, and a control unit configured to perform control so that, when the first display object is moved into the area in response to the instruction received by the instruction receiving unit, the first object is contained in the area and, when the third display object is moved into the area in response to the instruction received by the instruction receiving unit, the processing is performed on a content item corresponding to the first display object contained in the area, and, when the fourth display object is moved into the area in response to the instruction received by the instruction receiving unit, a condition regarding movement of the third display object into the area or from the area displayed on the display unit is set.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments of the invention, and, together with the description, serve to explain the principles of the invention.

FIG. 5 illustrates an exemplary image list used for managing images, which are examples of content items.

FIG. 6 illustrates an exemplary image property list used for managing image property tags.

FIG. 7 illustrates an exemplary function property list used for managing function property tags.

FIG. 13 illustrates an example of a display screen representing a user interface according to a second embodiment of the present invention.

FIG. 14 illustrates an example of a display screen representing a user interface according to the second embodiment of the present invention.

FIG. 16 is a flowchart illustrating an image classification process according to the second embodiment of the present invention.

DESCRIPTION OF THE EMBODIMENTS

Various exemplary embodiments of the present invention are described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

In the following exemplary embodiments, as an example of a content management apparatus, the configuration and operations of an image management apparatus that manages images are described.

First Embodiment

Hardware

Figure 1:
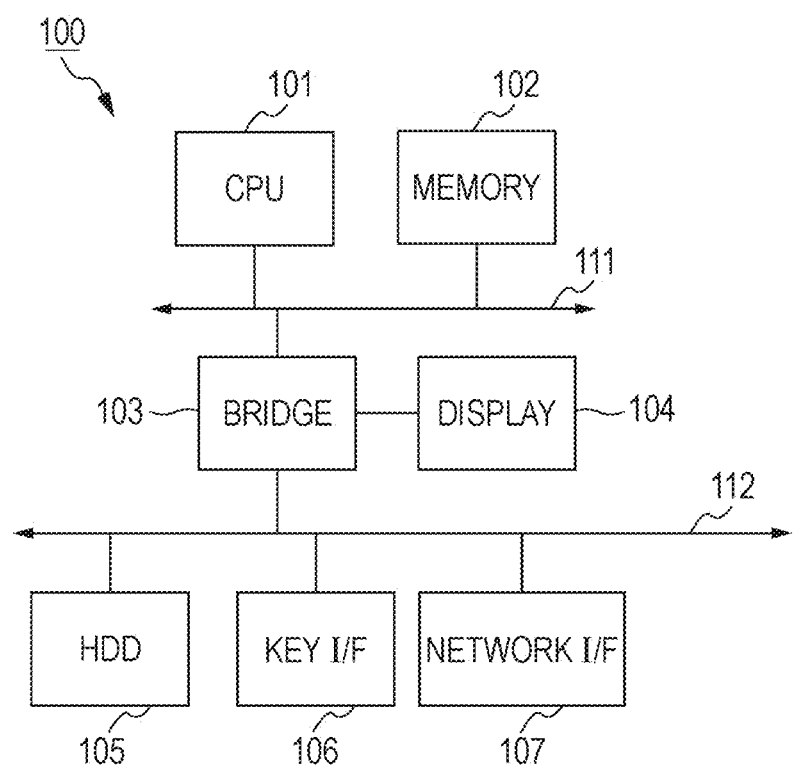
FIG. 1 is a block diagram of an exemplary configuration of a content management apparatus according to an embodiment of the present invention.

FIG. 1 is a block diagram of an exemplary configuration of a personal computer (PC) 100 serving as an image management apparatus according to the present embodiment of the invention. As shown in FIG. 1, the PC 100 includes a central processing unit (CPU) 101, a main memory 102, a bridge unit 103 that bridges between a main bus 111 and a peripheral bus 112, a display unit 104, a storage unit 105, a key input unit 106, and a network interface (I/F) 107. The display unit 104 is connected to the bridge unit 103 using a graphic port. The display unit 104 is controlled by the CPU 101 so as to display a variety of user interfaces (described below). The storage unit 105 is connected to the peripheral bus 112. In the present embodiment, a hard disk drive (HDD) is used for the storage unit 105. The key input unit 106 is an operation member that receives user operations. In the present embodiment, a keyboard and a mouse are used for the key input unit 106.

The CPU 101 is a control unit that controls the PC 100. The CPU 101 receives user instructions through, for example, the key input unit 106. Thereafter, the CPU 101 executes a variety of programs (described below) in accordance with the received instructions so as to control the display operation performed by the display unit 104. The storage unit 105 stores an operation procedure of the CPU 101 (e.g., a bootstrap process of the computer, a basic input and output operation, and programs for executing a variety of processes according to the present embodiment). The main memory 102 functions as a main memory of the CPU 101.

Outline of User Interface

The user interfaces according to the present embodiment are described in detail next.

Figure 2:
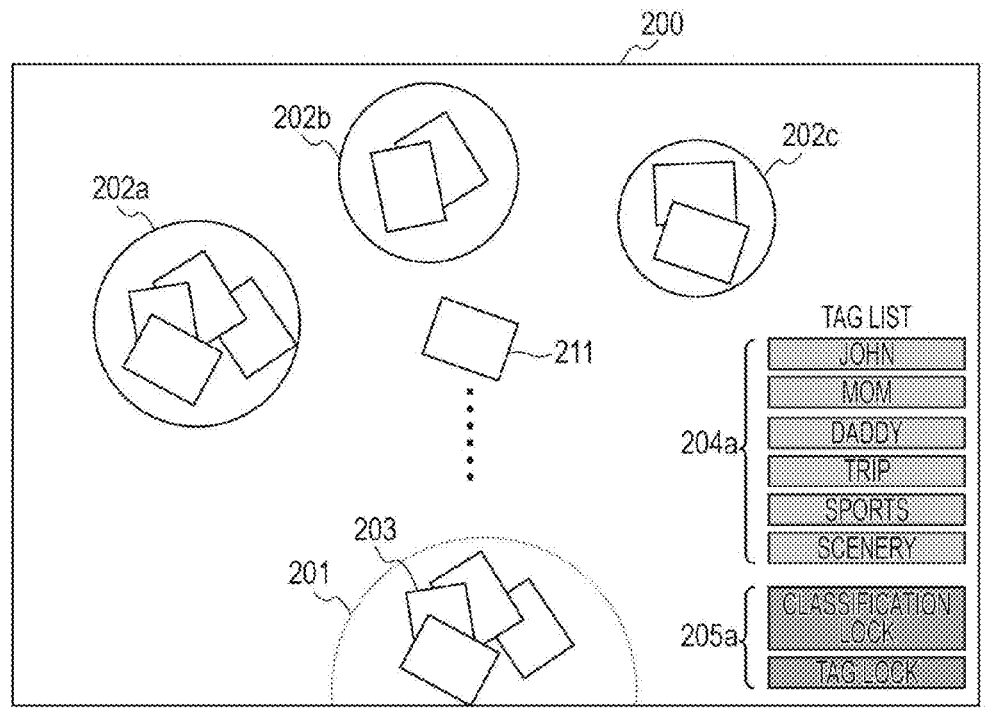
FIG. 2 illustrates an example of a display screen representing a user interface according to a first embodiment of the present invention.
Figure 3:
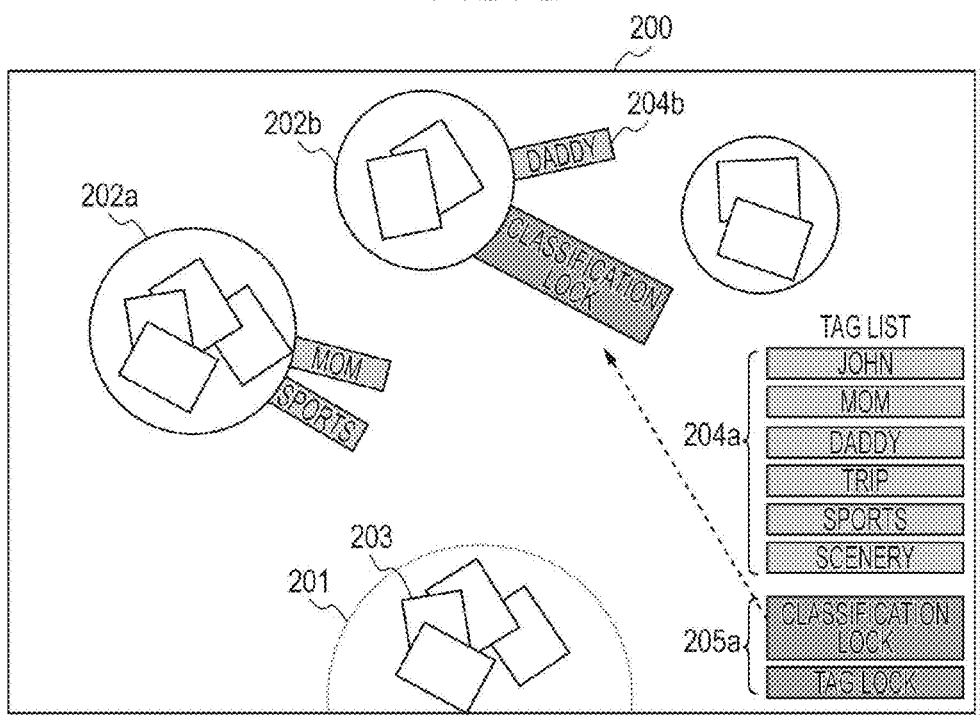
FIG. 3 illustrates an example of a display screen representing a user interface according to the first embodiment.
Figure 4:
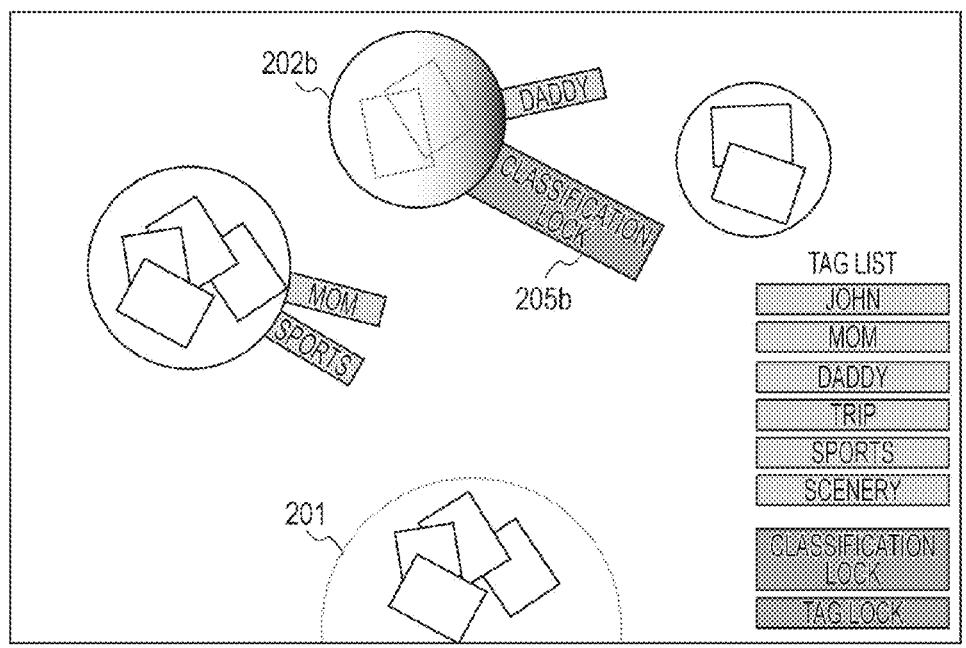
FIG. 4 illustrates an example of a display screen representing a user interface according to the first embodiment.

As examples of the user interface provided by the PC 100, FIGS. 2, 3, and 4 illustrate examples of screens displayed on the display unit 104 by application software, which includes programs stored in the storage unit 105 and executed by the CPU 101.

In FIG. 2, a window 200 represents a display area of the user interface according to the present embodiment displayed on the display unit 104. Classified image areas 202a, 202b, and 202c indicated by circles are used for classifying images. Images displayed in each of the classified image areas 202a, 202b, and 202c are classified into one group. A to-be-classified image area 201 indicated by a semicircle located in the lower portion of the window 200 in the middle is an area for preserving images before the images are classified. Initially, all of the unclassified images recorded in a recording medium, such as the storage unit 105 of the PC 100, images stored in a folder specified by a user, or images captured at a certain date are displayed in the to-be-classified image area 201. An image 203 (a first display object) is a thumbnail of an image that is present in the to-be-classified image area 201 and that has not yet been classified. The user can classify the image 203 displayed in the to-be-classified image area 201 by dragging and dropping into one of the classified image areas 202a, 202b, and 202c. An image 211 is a thumbnail of an image that is being moved from the to-be-classified image area 201 to the classified image area 202b through a drag-and-drop operation.

According to the present embodiment, a display object called a "tag" is displayed at the lower right of the window 200. Among a variety of tags, image property tags 204a (third display objects) indicate the properties of an image. Function property tags 205a (second display objects) define the function properties of the classified image areas. By dragging and dropping one of the image property tags 204a into one of the classified image areas, the user can attach the property to all of the images grouped in the classified image area at one time. For example, by dragging and dropping an image property tag named "daddy" among the image property tags 204a in the classified image area 202b, the property "daddy" is attached to all of the images in the classified image area 202b.

FIG. 3 illustrates an example of images that are present in a classified image area when a property is attached to the images. More specifically, FIG. 3 illustrates images displayed after an image property tag 204b indicating a "daddy" property is dropped in the classified image area 202b and, subsequently, image property tags indicating a "mom" property and a "sports" property are dropped in the classified image area 202b. In addition, in FIG. 3, a "classification lock" tag among the function property tags 205a is being attached to the classified image area 202b. At that time, the "daddy" property is attached to the images grouped in the classified image area 202b, while the "mom" property and "sports" property are attached to the image grouped in the classified image area 202a. Note that when a property is attached to an image, information representing the property is recorded in a header of the image file (e.g., Exif information of a Jpeg file), or the property information is recorded in a file different from the image file in association with the image file.

By dragging and dropping one of the function property tags 205a into a classified image area, the function property can be attached to the classified image area. Unlike the image property, the function property is attached to a classified image area. The function property defines a condition of classification performed in the classified image area. That is, by dragging and dropping one of the function property tags 205a in a classified image area, a condition for moving images and an image property tag from and to another classified image area can be set. An example of the function property is a "classification lock" property. By using the "classification lock" property, an image cannot be added to or removed from a classified image area having the "classification lock" property. That is, the "classification lock" property prohibits further classification operation performed for the classified image area. For example, when a sufficient number of images that should be grouped in a classified image area having a "daddy" property are collected and if the user does not want to add an image having a "daddy" property any more, the user attaches the "classification lock" property to the classified image area. Thus, the adding of an image to the classified image area can be prohibited. As shown in FIG. 3, by dragging and dropping, into the classified image area 202b, the classification lock tag among the function property tags 205a located at the lower right of the window 200, the "classification lock" property can be attached to the classified image area 202b.

FIG. 4 illustrates an example of a screen displayed after a classification lock property is attached to the classified image area 202b. As shown in FIG. 4, when a classification lock property is attached to the classified image area 202b, the classified image area 202b is painted over with a semi-transparent color, as if the classified image area 202b has been covered with a plastic wrap. This "wrapped" display tells the user that a classification lock property is attached to the classified image area 202b and, therefore, addition and removal of an image are prohibited. In addition, the user can easily recognize the images present in the classified image area 202b. At that time, even when the user drags and drops an image from the to-be-classified image area 201 into the classified image area 202b, display control is performed so that the dropped image is returned to the to-be-classified image area 201. Thus, any image cannot be added to the classified image area 202b. In addition, display control is performed so that even when the user attempts to move an image in the classified image area 202b to another classified image area, the user cannot hold (drag) the image. Thus, the user cannot remove any image from the classified image area 202b. At that time, in order to add an image to or remove an image from the classified image area 202b, the user needs to move a classification lock tag 205b to the lower right area, which is an original location, and unlock the classification lock property.

Another example of the function property is a "tag lock" property. When the "tag lock" property is attached to a classified image area, an image property tag cannot be dropped in the classified image area. In addition, a dropped image property tag cannot be removed. By attaching the "tag lock" property to a classified image area, the user can fix the image properties that can be attached to the images grouped in the classified image area.

Data Structure

The data structure that realizes the above-described user interfaces is described below.

In order to provide the user interfaces described in FIGS. 2 to 4, the image management apparatus according to the present embodiment manages states using four lists shown in FIGS. 5 to 8. These four lists are an image list (see FIG. 5), an image property list (see FIG. 6), a function property list (see FIG. 7), and an area management list (see FIG. 8).

FIG. 5 illustrates an exemplary image list for managing images. The image list includes the following fields:

an iID 501 indicating an ID used for identifying an image, a file name 502 of an image file, a path 503 for indicating the location at which the image file is located in the system, display information 504 indicating the location at which the thumbnail of the image is displayed in the window 200 (layer information indicating the position, orientation, and overlay of the image), and group information 505 for indicating a group to which the image belongs (gID is contained).

FIG. 6 illustrates an exemplary image property list for managing image property tags. The image property list includes the following fields:

an mID 601 used for identifying an image property tag, an image property name 602 of the image property tag (a property name (e.g., "daddy" or "mom") is contained), and display information 603 indicating the location at which the image property tag is displayed.

FIG. 7 illustrates an exemplary function property list for managing function property tags. The function property list includes the following fields:

an fID 701 used for identifying a function property tag, a function property name 702 of the function property tag (a property name (e.g., "classification lock") is contained), and display information 703 indicating the location at which the function property tag is displayed.

Figure 8:
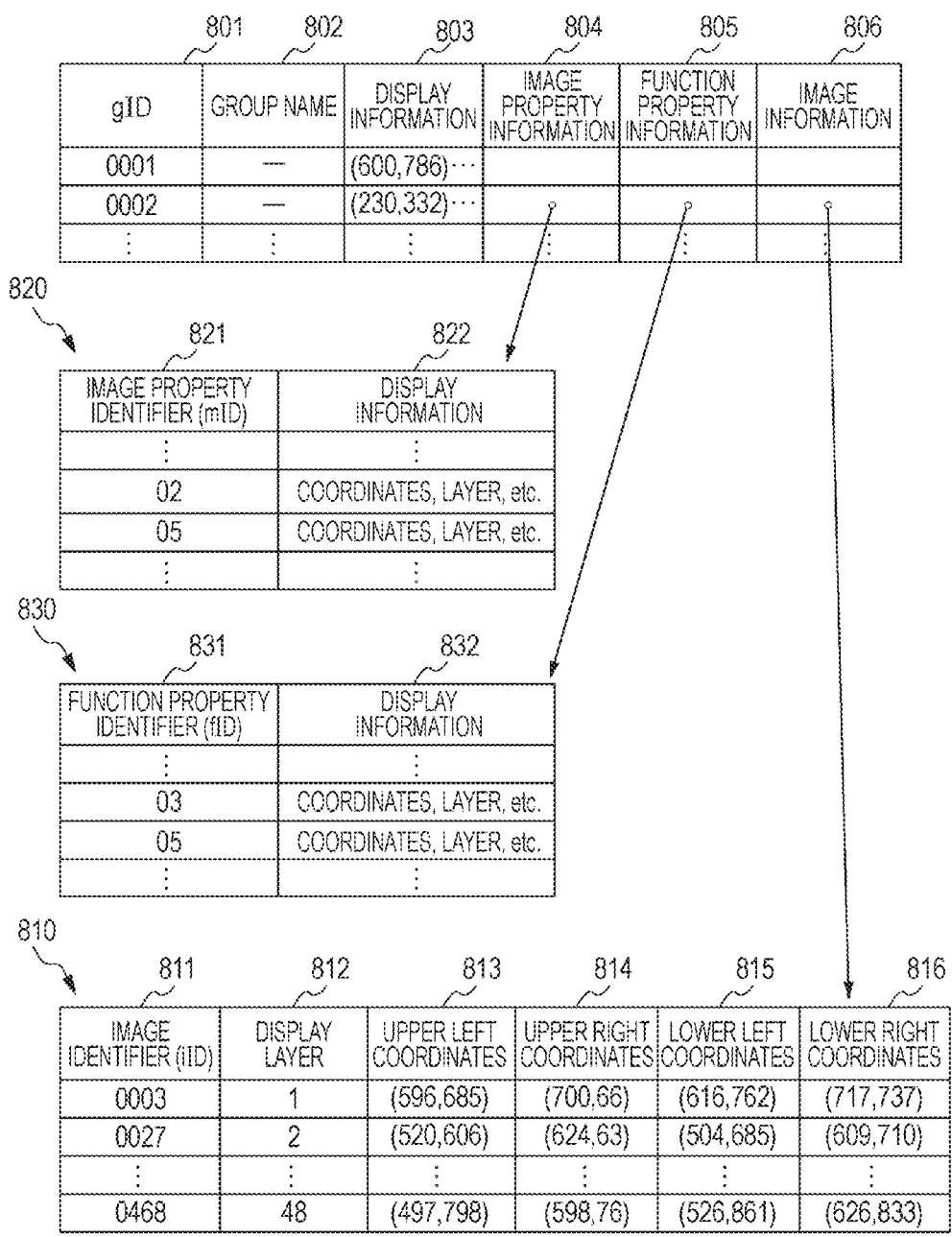
FIG. 8 illustrates an exemplary area management list used for managing a to-be-classified image area and classified image areas.

FIG. 8 illustrates an exemplary area management list used for managing the to-be-classified image area 201 and each of classified image areas. The area management list includes the following fields:

an gID 801 used for identifying an area, a group name 802 of the area (note that this field is not used in the present embodiment), display information 803 indicating the location at which the area is displayed (layer information indicating the position, orientation, and overlay of the area), a pointer 804 indicating an image property management table 820 used for managing the image properties attached to the area, a pointer 805 indicating a function property management table 830 used for managing the function properties attached to the area, and a pointer 806 indicating an image management table 810 used for managing images classified into the area.

Note that, in the example shown in FIG. 8, the area having gID of "0001" serves as a to-be-classified image area. The other areas serve as classified image areas.

The image property management table 820 is provided for each of the areas. The image property management table 820 is used for managing image property tags attached to the area. The image property management table 820 includes the following fields:

an identifier 821 for identifying an attached image property tag (mID is contained), and display information 822 regarding the attached image property tag (e.g., the coordinates and display layer information).

The function property management table 830 is provided for each of the areas. The function property management table 830 is used for managing function property tags attached to the area. The function property management table 830 includes the following fields:

an identifier 831 for identifying an attached function property tag (fID is contained), and display information 832 regarding the attached function property tag (e.g., the coordinates and display layer information).

The image management table 810 is provided for each of the areas. The image management table 810 is used for managing images classified into the area as a set. The image management table 810 includes the following fields:

an identifier 811 for identifying a classified image (iID is contained), display layer 812 that indicates the overlay relationship between the front layer and the background layer, the upper left coordinates 813 at which the classified image is displayed, the upper right coordinates 814 at which the classified image is displayed, the lower left coordinates 815 at which the classified image is displayed, and the lower right coordinates 816 at which the classified image is displayed.

The image having an image file name "IMG_0003" has the display layer "1", which indicates the frontmost position. As illustrated in FIGS. 2 to 4, since images are displayed in an overlay manner, the display layer 812 indicates the overlay relationship between the front layer and the background layer. In addition, as illustrated in FIGS. 2 to 4, in order to cause the user to feel that the images naturally overlap with one another, the images are positioned so as to be naturally rotated with respect to one another. Thus, the left coordinates 813, the upper right coordinates 814, the lower left coordinates 815, and the lower right coordinates 816 are used. If each of the images is displayed only horizontally, only the upper left coordinates 813 and the lower right coordinates 816 are needed. However, since the images are rotated in the above-described manner, the coordinates of the four corners of the image are contained in the image management table 810.

Image Management Processing

Figure 9:
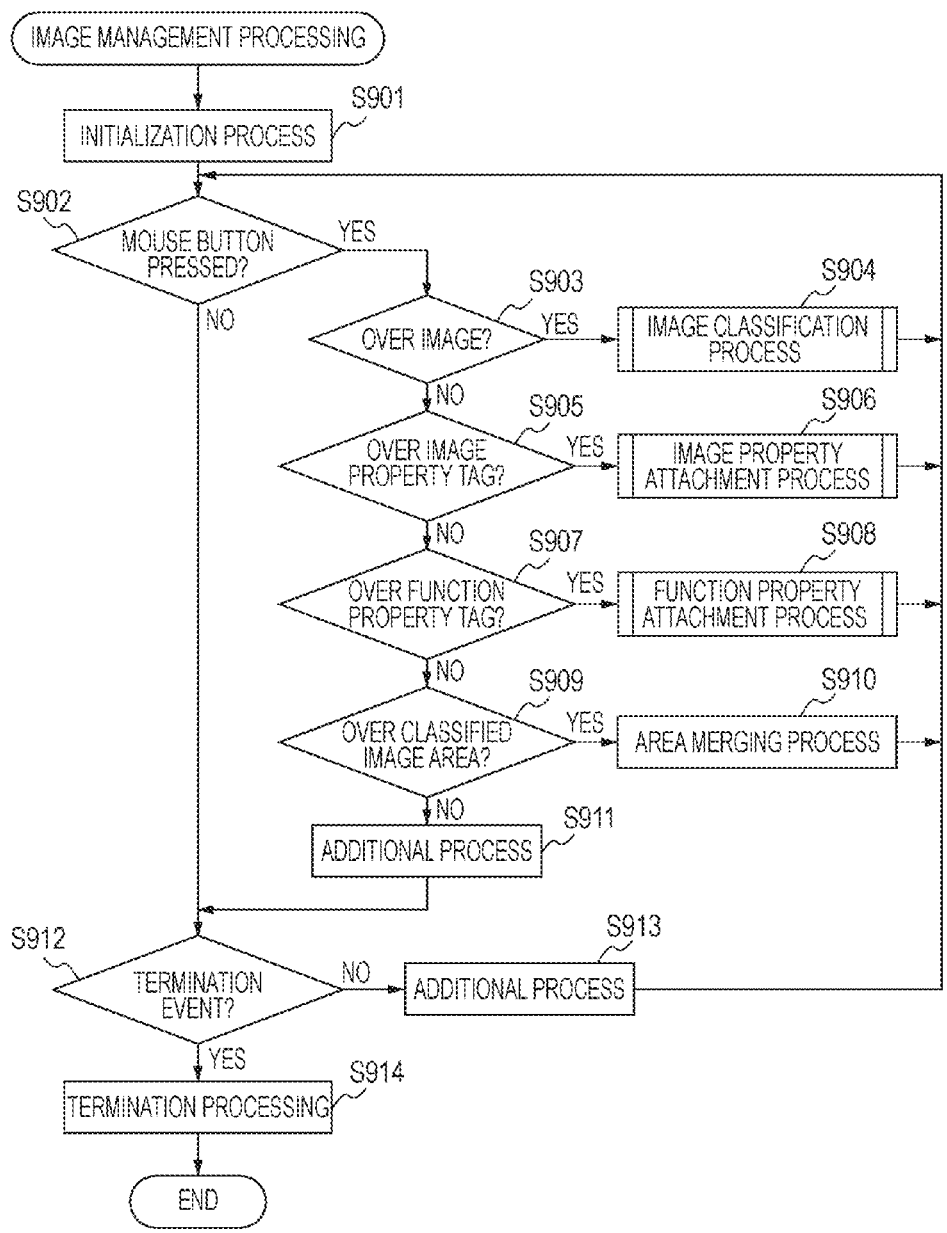
FIG. 9 is a flowchart of overall image management processing according to an embodiment of the present invention.

FIG. 9 illustrates exemplary image management processing according to the present embodiment. The user interfaces illustrated in FIGS. 2 to 4 are realized through this image management processing using the above-described lists illustrated in FIGS. 5 to 8. In order to perform this image management processing, the CPU 101 shown in FIG. 1 reads an image management application program from the storage unit 105 and loads the image management program into the main memory 102. Subsequently, the CPU 101 executes the image management application program.

When the image management application program is started, the CPU 101 shown in FIG. 1 initializes the application program in step S901. As a result, the screen of the image management application program is displayed, as shown in FIG. 2. Thereafter, the processing proceeds to step S902, where the CPU 101 determines whether a cursor of a mouse of the key input unit 106 is positioned within the window 200 and a mouse button is pressed. If the mouse button is not pressed, the processing proceeds to step S912.

If, in step S902, the mouse button is pressed, the processing proceeds to step S903. Through steps S903, S905, S907, and S909, the CPU 101 determines the position of the mouse cursor in the window 200 when the mouse button is pressed.

In step S903, the CPU 101 determines whether, when the mouse button is pressed, the mouse cursor is located in any one of the thumbnails (the first display objects) of the images. More specifically, when the CPU 101 receives a mouse button click event, the CPU 101 compares the coordinates of the mouse cursor with the display information 504 regarding the thumbnail of each of all of the images listed in the image list (see FIG. 5). Thus, the CPU 101 can determine whether the mouse button is pressed while the mouse cursor is over one of the thumbnails of the images. If the mouse button is pressed while the mouse cursor is over one of the thumbnails of the images, the processing proceeds to step S904, where the images are classified. Thereafter, the processing returns to step S902, where the CPU 101 waits for input from the user again. The image classification processing performed in step S904 is described in more detail below with reference to FIG. 10. If, in step S903, it is determined that the mouse button is pressed at a position outside any one of the thumbnails, the processing proceeds to step S905.

In step S905, the CPU 101 determines whether, when the mouse button is pressed, the mouse cursor is located over any one of the image property tags. More specifically, when the CPU 101 receives a mouse button click event, the CPU 101 acquires the coordinates of the mouse cursor when the mouse button is pressed. Subsequently, the CPU 101 compares the coordinates of the mouse cursor with the display information of each of all of the image property tags listed in the image property list (see FIG. 6). Thus, the CPU 101 can determine whether the mouse button is pressed while the mouse cursor is over one of the image property tags. If the mouse button is pressed while the mouse cursor is over one of the image property tags, the processing proceeds to step S906, where the image property is attached. Thereafter, the processing returns to step S902, where the CPU 101 waits for input from the user again. The image property attachment processing performed in step S906 is described in more detail below with reference to FIG. 11. If, in step S905, it is determined that the mouse button is pressed while the mouse cursor is located at a position outside any one of the image property tags, the processing proceeds to step S907.

In step S907, the CPU 101 determines whether, when the mouse button is pressed, the mouse cursor is located in any one of the function property tags. More specifically, when the CPU 101 receives a mouse button click event, the CPU 101 acquires the coordinates of the mouse cursor when the mouse button is pressed. Subsequently, the CPU 101 compares the coordinates of the mouse cursor with the display information of each of all of the function property tags listed in the function property list (see FIG. 7). Thus, the CPU 101 can determine whether the mouse button is pressed while the mouse cursor is over one of the function property tags. If the mouse button is pressed while the mouse cursor is over one of the function property tags, the processing proceeds to step S908, where the function property is attached. Thereafter, the processing returns to step S902, where the CPU 101 waits for input from the user again. The function property attachment process performed in step S908 is described in more detail below with reference to FIG. 12. If, in step S907, it is determined that the mouse button is pressed while the mouse cursor is located at a position outside any one of the function property tags, the processing proceeds to step S909.

In step S909, the CPU 101 determines whether, when the mouse button is pressed, the mouse cursor is located over any one of the classified image areas. If the mouse cursor is located over any one of the classified image areas, the processing proceeds to step S910. At that time, since it has already been determined in step S903 that the mouse click was not performed over one of the thumbnails of the images, the mouse button is clicked while the mouse cursor is over the classified image area at a position outside any one of the thumbnails of the images. In step S910, an area merging process is performed. According to the image management processing of the present embodiment, by dragging and dropping a classified image area in another classified image area, the two classified image areas can be merged into one classified image area. When the merging operation is performed, the image lists and the area management lists are updated so that the images contained in the two classified image areas are contained in the single merged classified image area. In addition, the image property lists, function property lists, and area management lists are updated so that the image property tags and function property tags attached to the two classified image areas belong to the single merged classified image area. Subsequently, the screen display is updated in accordance with the update lists. If a drag and drop operation into another classified image area is not performed after the mouse button is clicked on the classified image area determined in step S909, the screen display is returned to the original screen display. Upon completion of the processing performed in step S910, the processing returns to step S902, where the CPU 101 waits for input from the user again.

However, if, in step S909, it is determined that the mouse cursor is not located in any one of the classified image areas when the mouse button is pressed, the processing proceeds to step S911. In step S911, the determination made in each of steps S903, S905, S907, and S909 was "No", and the mouse button is pressed in the window 200. Thus, the processing corresponding to the mouse click position is performed.

In step S912, the CPU 101 determines whether a termination event is generated. If the termination event is not generated, the processing proceeds to step S913, where, if input other than mouse button click and termination event generation is detected, the processing corresponding to that input is performed. Thereafter, the processing returns to step S902, where the CPU 101 waits for input from the user again. If, in step S912, a termination event (e.g., click on an application end button (not shown) located at the right end of a title bar) is detected, the processing proceeds to step S914. In step S914, the termination process of the application program is performed. Thus, the image management processing is completed.

Image Classification Processing

Figure 10:
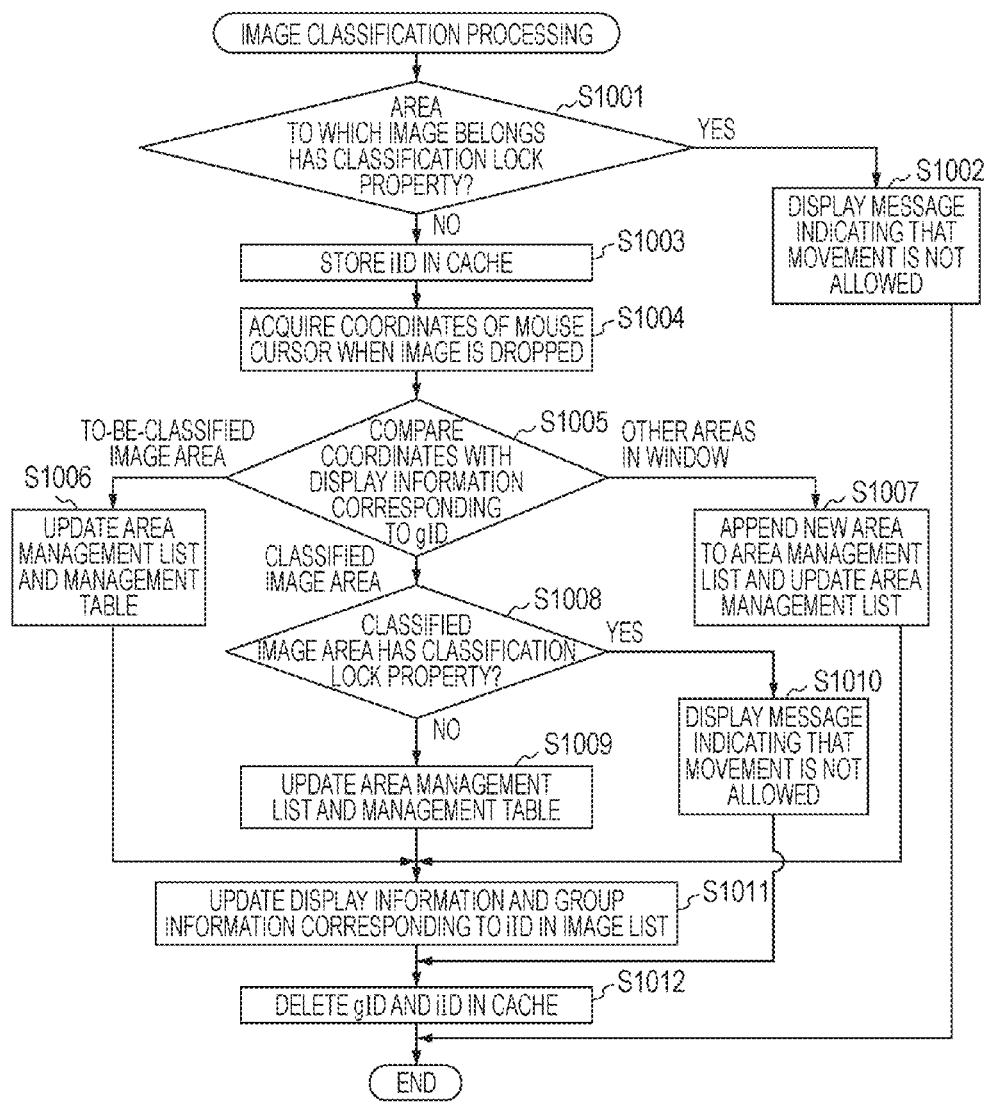
FIG. 10 is a flowchart illustrating an image classification process of the image management processing according to the embodiment.

FIG. 10 illustrates the details of the image classification processing performed in step S904 shown in FIG. 9.

Movement of an image (classification of an image) can be performed by pressing the mouse button over the thumbnail of an image displayed in the screen shown in FIG. 2, moving (dragging) the mouse cursor into a to-be-classified image area or a classified image area, and releasing the mouse button (dropping the image). In this way, the image classification processing shown in FIG. 10 can be performed. In order to perform this image classification processing, the CPU 101 shown in FIG. 1 reads an image management application program from the storage unit 105 and loads the image management program into the main memory 102. Subsequently, the CPU 101 executes the image management application program.

When the image management processing illustrated in FIG. 9 is being performed and if the mouse button is pressed while the mouse cursor is over one of the thumbnails of the images displayed in the window 200, the image classification processing is started.

In step S1001, the CPU 101 determines whether an area containing an image indicated by the mouse cursor when the mouse button is pressed has the classification lock property. This determination is made by acquiring, from the group information 505 in the image list shown in FIG. 5, gID of the area containing the image indicated by the mouse cursor when the mouse button is clicked, storing gID in a cache, and referring to the function property management table 830 indicated by the pointer 805 corresponding to gID in the area management list shown in FIG. 8. If the area has the classification lock property, the processing proceeds to step S1002. In step S1002, a message indicating that movement of an image in the area containing the image indicated by the mouse cursor when the mouse button is pressed is not allowed is displayed. Thereafter, the image classification processing is completed without performing processing subsequent to step S1003 (the main process of the image classification processing). However, if, in step S1001, it is determined that the area has not the classification lock property, the processing proceeds to step S1003.

In step S1003, iID of the image indicated by the mouse cursor when the mouse button is clicked is stored in the cache. Thereafter, the user moves the mouse cursor while pressing the mouse button (while holding the image) and releases the mouse button (drops the image) at a desired position. In this way, the user can move the image.

In step S1004, the CPU 101 acquires the coordinates of the position at which the mouse button is released (the image is dropped).

In step S1005, the CPU 101 compares the coordinates acquired in step S1004 with the display information 803 of each of the areas listed in the area management list (see FIG. 8) and determines whether the position at which the image is dropped (the mouse button is released) is within an area managed by the area management list. The determination result falls in one of the following three categories:

1) within a to-be-classified image area,
2) within one of classified image areas, and
3) within the window 200 at a position outside a to-be-classified image area and classified image areas.

If, in step S1005, it is determined that the position at which the mouse button is released is within the to-be-classified image area, the processing proceeds to step S1006. In step S1006, gID stored in the cache in step S1001 is referred to, and the display information 803 in the area management list (see FIG. 8) for the area before the image is moved is updated. In addition, the image management table 810 indicated by the pointer 806 is updated. Furthermore, the display information 803 for the target classified image area (in which the mouse button is released) and the image management table 810 indicated by the pointer 806 are updated. After the area management list and the image management table 810 are updated, the processing proceeds to step S1011.

In contrast, if, in step S1005, it is determined that the position at which the mouse button is released is within the window 200 at a position outside a to-be-classified image area and classified image areas, the processing proceeds to step S1007. In step S1007, as a user interface, a new classified image area is generated and displayed at the coordinates determined when the mouse button is released. Internally, the new area is appended to the area management list shown in FIG. 8. It is considered that the dropped image is moved into the new area. Thus, the area management list and the image management table 810 are updated. In addition, the display information 803 regarding the area before the image is moved and the image management table 810 indicated by the pointer 806 are updated. After the area management list and the image management table 810 are updated, the processing proceeds to step S1011.

However, if, in step S1005, it is determined that the position at which the mouse button is released is within one of classified image areas, the processing proceeds to step S1008. In step S1008, the CPU 101 determines whether the classified image area in which the mouse button is released has a classification lock property. This determination is made by referring to the function property management table 830 indicated by the pointer 805 in the area management list (see FIG. 8) for the classified image area in which the mouse button is released determined in step S1005. If, in step S1008, the CPU 101 determines that the classified image area in which the mouse button is released has not a classification lock property, the processing proceeds to step S1009.

In step S1009, the CPU 101 refers to gID stored in the cache in step S1001 and updates the display information 803 contained in the area management list (see FIG. 8) for the area before the image is moved. In addition, the CPU 101 updates the image management table 810 indicated by the pointer 806. Furthermore, the CPU 101 updates the display information 803 for the target classified image area (the area in which the mouse button is released) and the image management table 810 indicated by the pointer 806. After the area management list and the image management table 810 are updated, the processing proceeds to step S1011.

In contrast, if, in step S1008, the CPU 101 determines that the classified image area in which the mouse button is released has a classification lock property, the processing proceeds to step S1010. In step S1010, a message indicating that classification (movement) of the image in the area in which the mouse button was released is not allowed is displayed. Thereafter, display control is performed so that the dropped image is returned to the original position before the image classification processing is performed without updating the area management list and the management table shown in FIG. 8 (without performing the main process of the image classification processing). In this way, the adding of the thumbnail of the image into the classified image area having a classification lock property can be prohibited. After the processing in step S1010 is completed, the processing proceeds to step S1012.

In contrast, in step S1011, since the image classification processing has been performed, the display information 504 and the group information 505 for the image having iID stored in the cache in step S1003 among the images listed in the image list shown in FIG. 5 are updated. In addition, display information for the window 200 is updated in accordance with the updated display information 504 shown in FIG. 5 and the display information 803 in the area management list shown in FIG. 8. Thus, the images after the image classification processing is performed are displayed in the window 200. In addition, at that time, if the classified image area has an image property tag, the property information indicated by the image property tag attached to the area is written into the image file of the classified image. Note that, if the property information is written into the image file in this step, the property information can be updated in real time. However, file access occurs every time an image is classified, and therefore, complicated processing is needed. Therefore, the property information may be written into the file in one go in accordance with the image list (see FIG. 5), the image property list (see FIG. 6), the function property list (see FIG. 7), and the group list (see FIG. 8) when the image management processing of the present embodiment is completed. After the processing in step S1011 is completed, the processing proceeds to step S1012.

In step S1012, the CPU 101 deletes gID stored in the cache in step S1001 and iID stored in the cache in step S1003. Thus, the image classification processing is completed.

Image Property Attachment Processing

Figure 11:
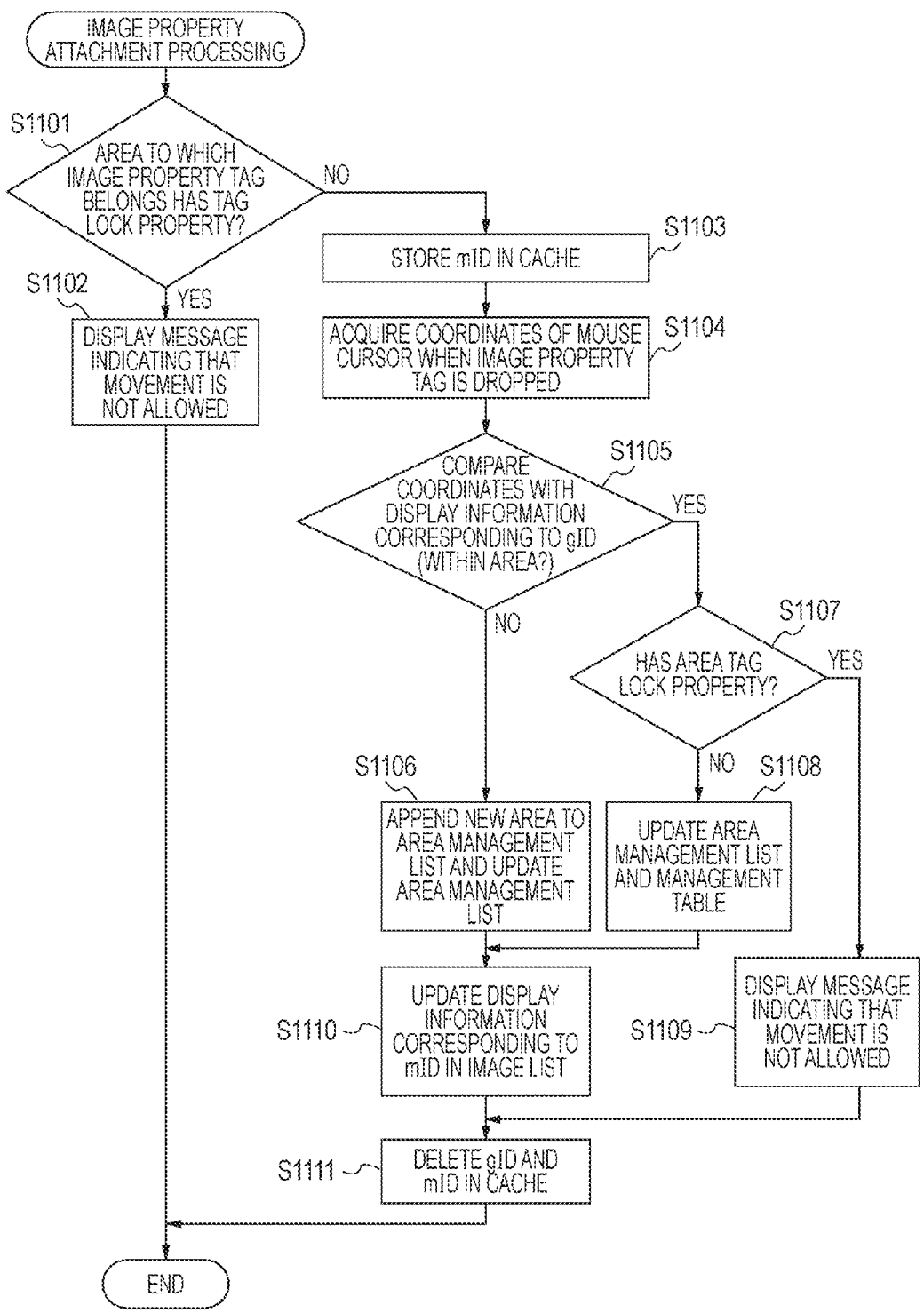
FIG. 11 is a flowchart illustrating an image property attachment process of the image management processing according to the embodiment.

FIG. 11 illustrates the details of the image property attachment processing performed in step S906 shown in FIG. 9.

The user presses the mouse button on the image property tag in the screen as shown in FIG. 2. Thereafter, the user moves the mouse cursor to a to-be-classified image area or a classified image area while pressing the mouse button and releases the mouse button (drops the tag image). In this way, the user can attach the property information to all of the images contained in the area in which the tag image is dropped. The processing performed through such an operation is the image property attachment processing illustrated in FIG. 11. In order to perform this image property attachment processing, the CPU 101 shown in FIG. 1 reads an image management application program from the storage unit 105 and loads the image management program into the main memory 102. Subsequently, the CPU 101 executes the image management application program.

When the mouse button is pressed while the mouse cursor is over the image property tag in the window 200 while the image management processing illustrated in FIG. 9 is being performed, the image property attachment processing is started.

In step S1101, if an image property tag indicated by the mouse cursor when the mouse button is pressed belongs to (is attached to) a to-be-classified image area or a classified image area, the CPU 101 determines whether the area has a tag lock property. This determination is made by acquiring gID of the area having the image property tag indicated by the mouse cursor, storing gID in a cache, and referring to the function property management table 830 indicated by the pointer 805 corresponding to gID in the area management list shown in FIG. 8. If the image property tag indicated by the mouse cursor when the mouse button is pressed does not belong to any one of the to-be-classified image areas and classified image areas, it is determined in step S1101 that the area has no tag lock property. If it is determined that the area has a tag lock property, the processing proceeds to step S1102. In step S1102, a message indicating that movement of an image into the area to which the image property tag indicated by the mouse cursor when the mouse button is pressed belongs is not allowed is displayed. Thereafter, the image property attachment processing is completed without performing processing subsequent to step S1103 (the main process of the image property attachment processing). However, if, in step S1101, it is determined that the area to which the image property tag belongs has no classification lock property, the processing proceeds to step S1103.

In step S1103, mID of the image property tag indicated by the mouse cursor when the mouse button is clicked is stored in the cache. Thereafter, the user moves the mouse cursor while pressing the mouse button (while holding the image property tag) and releases the mouse button (drops the image property tag) in a to-be-classified image area or a classified image area. In this way, the user can move (attach) the image property tag to the area.

In step S1104, the CPU 101 acquires the coordinates of the position of the mouse cursor at which the mouse button is released (the image property tag is dropped).

In step S1105, the CPU 101 compares the coordinates acquired in step S1104 with the display information 803 of each of the areas listed in the area management list (see FIG. 8) and determines whether the position at which the image is dropped (the mouse button is released) is within an area managed by the area management list. That is, the CPU 101 determines whether the position at which the image is dropped is within one of the to-be-classified image areas or one of the classified image areas.

If, in step S1105, it is determined that the position at which the image is dropped is within neither one of the to-be-classified image areas nor one of the classified image areas, the processing proceeds to step S1106. In step S1106, as a user interface, a new classified image area is displayed at the coordinates determined when the mouse button is released. Internally, the new area is appended to the area management list shown in FIG. 8. It is considered that the dropped image property tag is moved into the new area. Thus, the area management list and the image property management table 820 are updated. In addition, the information regarding the area listed in the area management list before the image property tag is moved is updated. After the area management list and the image property management table 820 are updated, the processing proceeds to step S1110.

However, if, in step S1105, it is determined that the position at which the mouse button is released is within one of the to-be-classified image areas and the classified image areas, the processing proceeds to step S1107. In step S1107, the CPU 101 determines whether the area in which the mouse button is released has a tag lock property. This determination is made by referring to the function property management table 830 indicated by the pointer 805 in the area management list (see FIG. 8) for the area in which the mouse button is released determined in step S1105. If, in step S1107, the CPU 101 determines that the area in which the mouse button is released has no tag lock property, the processing proceeds to step S1108.

In step S1108, the CPU 101 refers to gID stored in the cache in step S1101 and gID of the current area. Thereafter, the CPU 101 updates the area management list shown in FIG. 8 and the image property management table 820. After the area management list and the image property management table 820 are updated, the processing proceeds to step S1110.

If, in step S1107, it is determined that the area in which the mouse button is released has a tag lock property, the processing proceeds to step S1109. In step S1109, a message indicating that movement of the image property tag into the area in which the mouse button is released is not allowed (attachment of the image property tag to the area in which the mouse button is released is not allowed) is displayed. Thereafter, display control is performed so that the dropped image property tag is returned to the original position before the image property attachment processing is performed (i.e., the position before the image property tag is dragged) without updating the area management list and the image property management table 820 shown in FIG. 8. In this way, attachment of the image property tag to an area having a tag lock property can be prohibited. After the processing in step S1109 is completed, the processing proceeds to step S1111.

In contrast, in step S1110, since the image property tag has been attached to the area, the display information 603 regarding the image property tag contained in the image property list (see FIG. 6) and having mID stored in the cache in step S1103 is updated. In addition, display information for the window 200 is updated in accordance with the display information 603 in the update image property list (see FIG. 6) and the area management list (see FIG. 8). Thus, the images after the image property attachment processing is performed are displayed in the window 200. For example, the image property tag (the "daddy" tag) 204b attached to the classified image area 202b shown in FIG. 3 is displayed. By viewing this screen and adding an image to the classified image area 202b, the user can classify the image while recognizing that the "daddy" property is attached to the image. In addition, at that time, the property information indicated by the image property tag is written into the image files of the images that belong to the area. Note that, if the property information is written into the image file in this step, the property information can be updated in real time. However, file access occurs every time an image is classified, and therefore, complicated processing is needed. Therefore, the property information may be written into the file in one go in accordance with the various lists and tables when the image management processing of the present embodiment is completed. After the processing performed in step S1110 is completed, the processing proceeds to step S1111.

In step S1111, the CPU 101 deletes gID stored in the cache in step S1101 and mID stored in the cache in step S1103. Thus, the image property attachment processing is completed.

Function Property Attachment Processing

Figure 12:
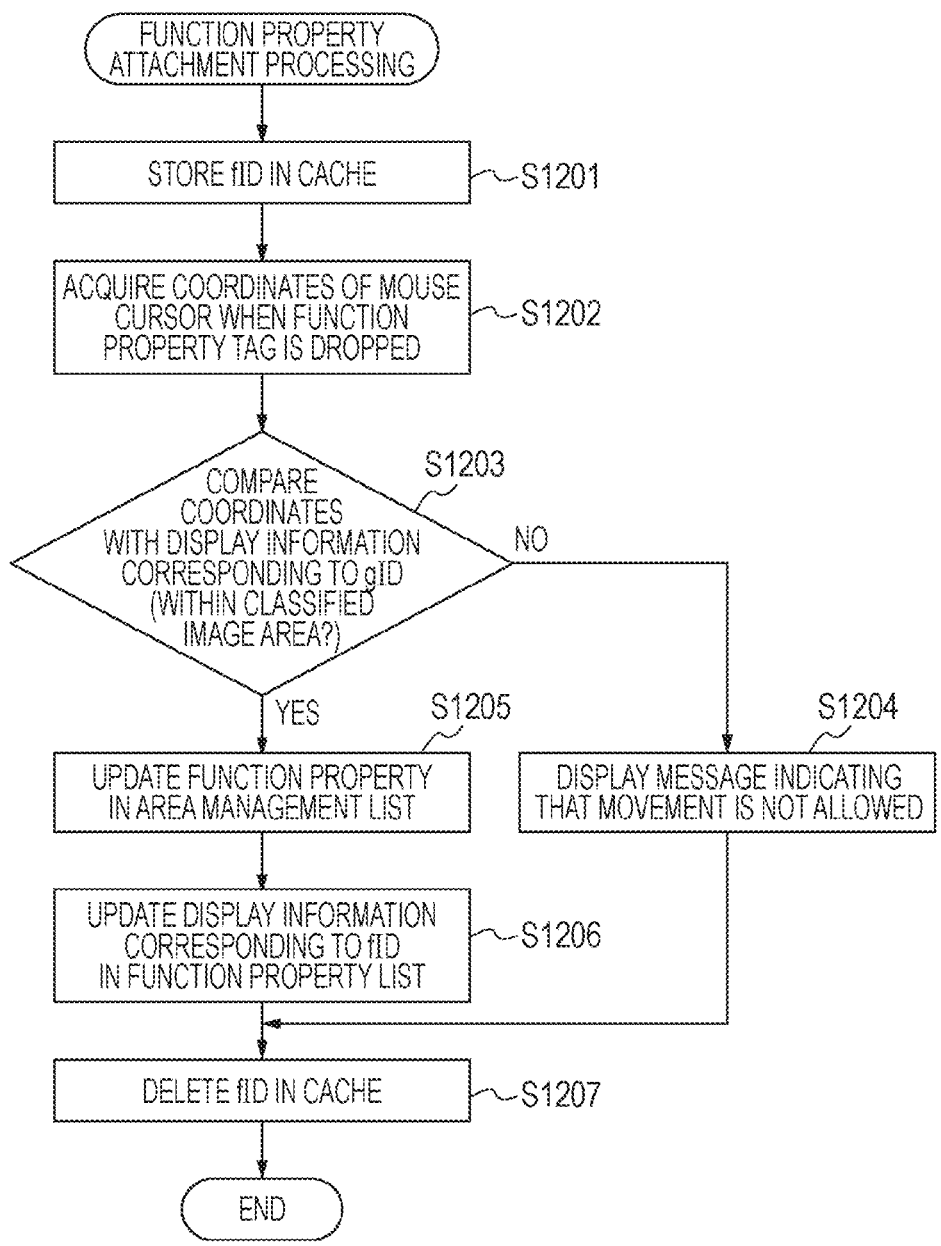
FIG. 12 is a flowchart illustrating a function property attachment process of the image management processing according to the embodiment.

FIG. 12 illustrates the details of the function property attachment processing performed in step S908 shown in FIG. 9.

A particular function can be attached to an area by pressing the mouse button on a function property tag in the screen as shown in FIG. 2, moving (dragging) the mouse cursor into a to-be-classified image area or a classified image area, and releasing the mouse button (dropping the function property tag). In this way, the function property attachment processing shown in FIG. 12 can be performed. In order to perform this function property attachment processing, the CPU 101 shown in FIG. 1 reads an image management application program from the storage unit 105 and loads the image management program into the main memory 102. Subsequently, the CPU 101 executes the image management application program.

When the mouse button is pressed while the mouse cursor is over the function property tag in the window 200 while the image management processing illustrated in FIG. 9 is being performed, the function property attachment processing is started.

In step S1201, fID of the function property tag indicated by the mouse cursor when the mouse button is pressed is stored in a cache. Thereafter, the user moves the mouse cursor while pressing the mouse button (while holding the function property tag) and releases the mouse button (drops the function property tag) in a classified image area. In this way, the user can move (attach) the function property tag to the area.

In step S1202, the CPU 101 acquires the coordinates of the position of the mouse cursor at which the mouse button is released (the function property tag is dropped).

In step S1203, the CPU 101 compares the coordinates acquired in step S1202 with the display information 803 of each of the areas listed in the area management list (see FIG. 8) and determines whether the position at which the function property tag is dropped (the mouse button is released) is within one of the classified image areas. If, in step S1203, it is determined that the position at which the mouse button is released is not within any one of the classified image areas, the processing proceeds to step S1204. However, if, in step S1203, it is determined that the position at which the mouse button is released is within one of the classified image areas, the processing proceeds to step S1205.

In step S1204, since the position of the mouse cursor at which the mouse button is released is not within any one of the classified image areas, movement of the function property tag is not allowed (the function property tag cannot be attached). Therefore, a message indicating that movement of the function property tag is not allowed is displayed. Thereafter, display control is performed so that the dropped function property tag is returned to the original position before the function property attachment processing is performed (i.e., the position before the function property tag is dragged) without updating the area management list and the function property management table 830 shown in FIG. 8. After the processing in step S1204 is completed, the processing proceeds to step S1207.

In contrast, in step S1205, the function property tag is attached to the classified image area. In addition, the area management list and the function property management table 830 shown in FIG. 8 for the classified image area into which the function property tag is moved are updated. Thereafter, the processing proceeds to step S1206, where the display information 703 in the function property management table (see FIG. 7) is updated. In addition, display information for the window 200 is updated in accordance with the update function property management table shown in FIG. 7, the area management list shown in FIG. 8, and the function property management table 830. Thus, the images after the function property attachment processing is performed are displayed in the window 200. In this way, for example, the screen is changed from the screen before the function property tag is attached to the screen in which the classified image area 202b is wrapped, as shown in FIG. 4, so that the user can know that a function property tag, such as the "classification lock" tag 205b, is attached to the classified image area 202b. After the processing performed in step S1206 is completed, the processing proceeds to step S1207.

In step S1207, the CPU 101 deletes fID stored in the cache in step S1201. Thus, the function property attachment processing is completed.

If, through the above-described function property attachment processing, the classification lock tag among a variety of function property tags is attached to the classified image area, a new image cannot be added into the classified image area. In addition, an existing image cannot be removed from the classified image area. Furthermore, if the tag lock property among a variety of function properties is attached to a classified image area, an image property tag cannot be attached to the classified image area. In addition, any image property tag attached to the classified image area cannot be removed.

Note that, among a variety of function property tags, the classification lock tag may be moved and attached to an image property tag attached to a to-be-classified image area or a classified image area. In such a case, display is performed so that, for example, the classification lock tag is connected to the image property tag. Thus, the image property tag having the classification lock tag connected thereto cannot be removed from the to-be-classified image area or classified image area.

According to the first embodiment described above, the user can perform the following operations using a common user interface (i.e., movement of an object):

1) an operation for classifying images, 2) an operation for attaching a property to images in a classified image group, and 3) an operation for attaching a function property to an area representing the classified image group.

In this way, even a user who is unfamiliar with the operation of a PC can easily and intuitively classify images without learning complicated operation procedures.

In addition, an easily recognizable user interface (UI) is provided that informs the user of addition of a function property to a classified image area. Furthermore, the UI is displayed in a screen used for classifying images. Accordingly, the user can classify the images into the classified image areas while easily understanding what the classification rules are. As a result, the user can efficiently classify the images.

Second Embodiment

According to a second embodiment, as another example of the usage of a function property tag, a "classification restriction" tag is used. The "classification restriction" tag is provided so as to correspond to an image property tag. By attaching the "classification restriction" tag to a classified image area, movement of only images having a particular property is not allowed (the images enter a classification lock mode). The second exemplary embodiment using the classification restriction tag is described below.

Since the hardware configuration and data structure are the same as those of the first embodiment, the descriptions thereof are not repeated.

Outline of User Interface

Exemplary user interfaces according to the second embodiment using classification restriction are schematically described next with reference to FIGS. 13 to 16.

FIG. 13 illustrates a screen example of the user interface. The same numbering will be used in describing FIG. 13 as was utilized above in describing the first embodiment illustrated in FIG. 2. The difference between the second embodiment and the first embodiment illustrated in FIG. 2 is that, in the second embodiment, a classification restriction switch 206 is provided at the lower right of the screen. By clicking the classification restriction switch 206, the image property tags 204a arranged in the right of the screen are changed to classification restriction tags 207. Thus, the processing enters a classification restriction mode.

FIG. 14 illustrates a screen displayed after the classification restriction switch 206 is clicked and the processing enters a classification restriction mode. More specifically, the screen shown in FIG. 14 is displayed when "mom" and "sports" image property tags are attached to the classified image area 202a shown in FIG. 13 and a "daddy" image property tag is attached to the classified image area 202b shown in FIG. 13 and, subsequently, the classification restriction switch 206 is clicked so that the processing enters the classification restriction mode. The classification restriction tags 207, the function property tags 205a, and the classification restriction switch 206 are displayed on the right of the screen. The classification restriction tag 207 is one type of function property tag. Each of the classification restriction tags 207 corresponds to one of the image property tags. A comparison of FIGS. 13 and 14 shows that the number of the classification restriction tags 207 present in FIG. 14 is the same as that of the image property tags present in FIG. 13. In addition, the types of the tags in FIG. 14 are the same as those of the tags in FIG. 13. When the classification restriction tags 207 are moved (dragged and dropped) into a classified image area and are attached to the classified image area, the images that are contained in the classified image area and that have the properties defined in the classification restriction tags 207 cannot be moved from the area. In addition, an image that is not contained in the area having the classification restriction tags 207 attached thereto and that has the properties defined in the classification restriction tags 207 cannot be moved and added to that area.

Figure 15:
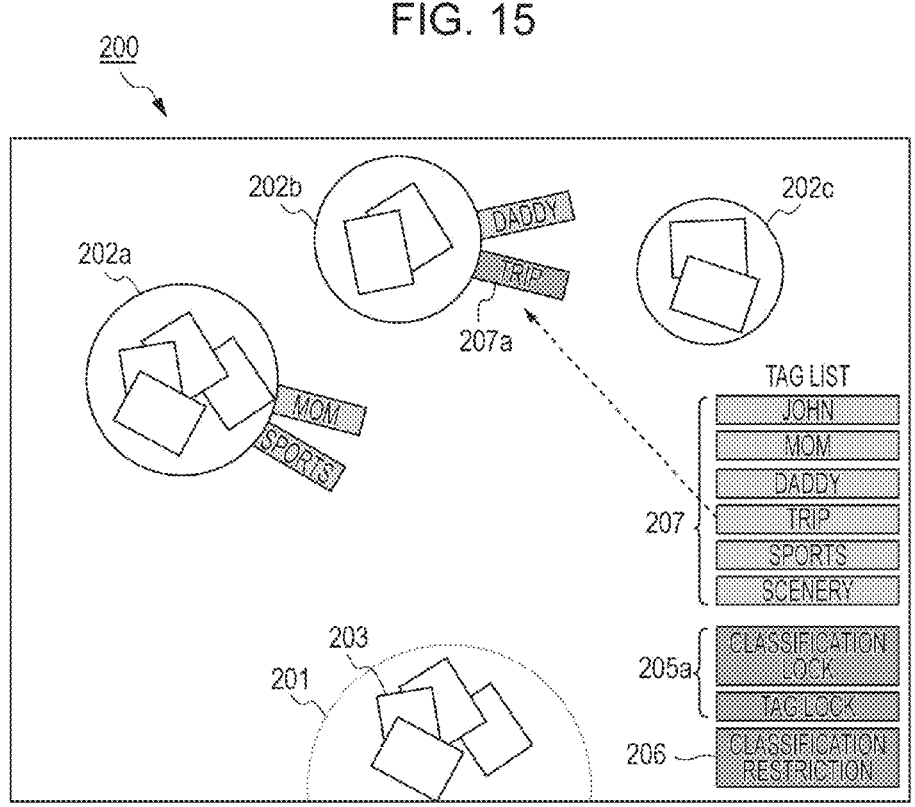
FIG. 15 illustrates an example of a display screen representing a user interface according to the second embodiment of the present invention.

FIG. 15 illustrates the case in which a "trip" tag 207a among the classification restriction tags 207 shown in FIG. 14 is attached to the classified image area 202b. As shown in FIG. 15, the "trip" tag 207a is moved to the classified image area 202b by dragging and dropping the "trip" tag 207a. In this way, the "trip" classification restriction tag 207a is attached to the classified image area 202b. After the "trip" classification restriction tag 207a is attached to the classified image area 202b, only the images that are contained in the classified image area 202b and that have the "trip" property enter a movement prohibited mode (a classification lock mode). In addition, an image having a "trip" property cannot be added to the classified image area 202b.

Processing for realizing the above-described user interfaces is described below. Since processing other than image classification processing is the same as that of the first embodiment, the description thereof is not repeated.

Image Classification Processing

FIG. 16 is a flowchart of the image classification processing according to the second embodiment performed in step S904 shown in FIG. 9. FIG. 16 illustrates an example of the image classification processing performed when a classification restriction property defined by a classification restriction tag is attached to a classified image area.

A user presses the mouse button on the thumbnail of an image in a screen shown in FIG. 16, moves the mouse cursor (drags the thumbnail) to a to-be-classified image area or a classified image area, and releases the mouse button (drops the thumbnail into the area). Thus, the image can be moved (classified). Through such an operation, the image classification processing according to the second embodiment can be performed.

When the mouse button is pressed while the mouse cursor is over one of the thumbnails of the images displayed in the window 200 (see FIG. 16), the image classification processing is started.

In step S2001, the CPU 101 determines whether an area containing an image indicated by the mouse cursor when the mouse button is pressed has the classification lock property. This determination is made in the same manner as in step S1001 shown in FIG. 10. If the area has the classification lock property, the processing proceeds to step S2002. In step S2002, a message indicating that movement of an image in the area containing the image indicated by the mouse cursor when the mouse button is pressed is not allowed is displayed. Thereafter, the image classification processing is completed. However, if, in step S2001, it is determined that the area has not the classification lock property, the processing proceeds to step S2020.

In step S2020, the CPU 101 determines whether the area containing the image indicated by the mouse cursor when the mouse button is pressed has a classification restriction property. If the area has the classification restriction property, the CPU 101 further determines whether the property of the area containing the image indicated by the mouse cursor when the mouse button is pressed matches the classification restriction property. This determination is made by searching the function property management table 830 indicated by the pointer 805 corresponding to gID in the area management list (see FIG. 8) for gID stored in the cache in step S2001. If the area has the classification restriction property, the CPU 101 acquires, using iID and the information in the image list (see FIG. 5), the property of the image indicated by the mouse cursor when the mouse button is pressed. Thereafter, the CPU 101 compares the acquired property with the classification restriction property. If the property of the image matches the classification restriction property, the processing proceeds to step S2002. In step S2002, a message indicating that movement of the image indicated by the mouse cursor when the mouse button is pressed from the area containing the image is not allowed is displayed for the user. Thereafter, the image classification processing is completed.

However, if, in step S2020, it is determined that the area containing the image indicated by the mouse cursor when the mouse button is pressed has no classification restriction property or that, although the area has a classification restriction property, the property of the image does not match the classification restriction property, the processing proceeds to step S2003.

Since the processing performed in steps S2003 to S2007 is the same as that performed in steps S1003 to S1007 illustrated in FIG. 10, the description thereof is not repeated.

In step S2008, it is determined whether the classified image area in which the mouse button is released (the thumbnail is dropped) has a classification restriction property. This determination is made by referring to the function property management table 830 indicated by the pointer 805 contained in the area management list (see FIG. 8) for the classified image area at the position at which the mouse button is released determined in step S2005. If, in step S2008, it is determined that the classified image area at the position at which the mouse button is released has no classification restriction property, the processing proceeds to step S2021. However, if it is determined that the classified image area has a classification restriction property, the processing proceeds to step S2010, where a message indicating that movement of the image is not allowed due to the classification restriction property is displayed. Thereafter, the processing proceeds to step S2012 without moving the image.

In step S2021, it is determined whether the classified image area in which the mouse button is released determined in step S2005 has a classification restriction property and the property of the dropped image matches the classification restriction property. The determination whether the area has a classification restriction property is made by referring to the function property management table 830 indicated by the pointer 805 contained in the area management list (see FIG. 8) for the classified image area at the position at which the mouse button is released determined in step S2005. If, in step S2021, it is determined that the classified image area has a classification restriction property, the CPU 101 acquires, using iID stored in the cache in step S2003 and the information in the image list (see FIG. 5), the property of the dropped image. Thereafter, the CPU 101 compares the acquired property of the dropped image with the classification restriction property. If it is determined that the property of the image matches the classification restriction property, the processing proceeds to step S2010.

In step S2010, a message indicating that movement of the dropped image having such a property into the classified image area is not allowed due to the classification restriction property is displayed. Thereafter, display control is performed so that the dropped image is returned to the original position before the image classification processing is performed without updating the area management list and the image management table 810 shown in FIG. 8 (without performing the main process of the image classification processing). In this way, addition of the thumbnail of the image having a particular property into the classified image area having the classification restriction property can be prohibited. After the processing in step S2010 is completed, the processing proceeds to step S2012.

However, if, in step S2021, it is determined that the classified image area in which the image is dropped has no classification restriction property or that, although the classified image area has a classification restriction property, the property of the dropped image does not match the classification restriction property, the processing proceeds to step S2009.

Since the processing performed in steps S2009, S2011, and S2012 is the same as that performed in steps S1009, S1011, and S1012 illustrated in FIG. 10, the description thereof is not repeated.

According to the second embodiment, by using a classification restriction tag, movement of only images having a particular property from the classified image area can be prohibited. Therefore, accidental removal of an image having a particular property from the group (the classified image area) can be protected. In addition, accidental addition of an unwanted image having a particular property into the classified image area can be prohibited.

While the above-described description has been made with reference to an image as a content item to be classified, any content item can be classified in addition to an image. For example, by replacing the thumbnail of an image with a display object, such as an icon representing a content item (e.g., a document file or a music file) in the above-described user interfaces, the classification techniques of the above-described embodiments may be applied.

In addition, any type of property that can define a classification function (a classification rule) for a classified image area can be used as a function property (the second object). That is, the function property is not limited to the above-described classification lock property, tag lock property, and classification restriction property. For example, a property for prohibiting only addition of an image to a classified image area or a property for prohibiting only deletion of an image from a classified image area may be used. Furthermore, a property for automatically adding an image having a particular condition (e.g., the property information attached to the image) into a classified image area may be used. Still furthermore, a property for automatically deleting an image having a particular condition (e.g., the property information attached to the image) from a classified image area may be used.

The operation method for moving an object is not limited to a drag-and-drop method using a mouse. A drag-and-drop method using a pointing device other than a mouse may be used. In addition, a drag-and-drop method using a touch panel may be used. Furthermore, in addition to the drag-and-drop method, any method that allows a user to intuitively recognize the operation for moving an object to a classified image area can be used. Still furthermore, while the above-described embodiments have been described with reference to an application running on a PC, the present invention is not limited thereto. For example, the present invention is applicable to any system that has an appropriate display device and an appropriate input device and that can classify content items.

The processing of the above-described embodiments may be realized by providing a storage medium storing a software program that realizes the function of the above-described exemplary embodiments to a system or an apparatus and by causing a computer (central processing unit (CPU) or microprocessing unit (MPU)) of the system or apparatus to read out and execute the software program code. In such a case, the program code itself read out of the storage medium realizes the functions of the above-described embodiments. Therefore, the storage medium storing the program code can also realize the present invention. Examples of the storage medium for supplying the software program include a floppy disk (trade name), a hard disk, an optical disk, an MO (magneto optical) disk, a CD-ROM (compact disk-read only memory), a CD-R (CD recordable), a magnetic tape, a non-volatile memory card, a ROM or the like.

In addition to realizing the functions of the above-described embodiments by executing the software program, the functions of the above-described embodiments can be realized by a process in which a program, such as an OS (operating system), executes some of or all of the functions of the above-described embodiments in accordance with the instructions of the software program.

Alternatively, the software program read from the storage medium may be written into a memory of an add-on expansion board set in a computer or a memory of an add-on expansion unit connected to a computer. Subsequently, a CPU incorporated in the add-on expansion board or the add-on expansion unit may execute some of or all of the functions of the above-described embodiments in accordance with the instructions of the software program.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-130759 filed May 19, 2008, which is hereby incorporated by reference herein in its entirety.

What is claimed is:

1. A content management apparatus comprising:
    a display control unit configured to perform control so that a first display object representing a content item, an area that contains the first display object, and at least one of a plurality of second display objects to define a function property of the area, the second display object used for setting a condition regarding movement of the first display object into the area or from the area are displayed on a display unit;
    a position inputting unit configured to receive an input of a position in a display screen of the display unit;
    an instruction receiving unit configured to receive a drag operation;
    a drag control unit configured to perform control so that, in a case where the first display object is displayed at the position which is being input by the position inputting unit when a start of the drag is received by the instruction receiving unit, the first display object is dragged and, in a case where the second display object is displayed at the position which is being input by the position inputting unit when a start of the drag is received by the instruction receiving unit, the second display object is dragged; and
    a control unit configured to perform control so that, if the first display object is dragged and moved into the area from outside the area and is dropped on the area, the first object is contained in the area and, if the second display object is dragged and moved into the area from outside the area, and is dropped on the area, a condition regarding movement of the first display object into the area or from the area displayed on the display unit is set, wherein the plurality of second display objects includes a second display object having a function property of prohibition conditions associated with classification, and a second display object having a function property of prohibition conditions associated with tag of the first display object.

2. The content management apparatus according to claim 1, wherein the display control unit further performs control so that a third display object used for instructing processing to be performed on the content item represented by the first display object contained in the area and a different second display object used for setting a condition regarding movement of the third display object into the area or from the area are displayed on a display unit, and wherein the instruction receiving unit further receives instructions instructing movement of the third display object and the different second display object on the display unit, and wherein the control unit further performs control so that, when the third display object is moved into the area in response to the instruction received by the instruction receiving unit, the processing is performed on the content item corresponding to the first object contained in the area and, when the different second display object is moved into the area in response to the instruction received by the instruction receiving unit, a condition regarding movement of the third display object into the area or from the area displayed on the display unit is set.

3. The content management apparatus according to claim 2, wherein the third display object is used for instructing that a particular property is attached to a content item corresponding to the first display object contained in the area, and wherein, when the third display object is moved into the area in response to the instruction received by the instruction receiving unit, the control unit performs control so that a particular property is attached to all of a plurality of content items corresponding to the first display objects contained in the area.

4. The content management apparatus according to claim 1, further comprising:
    an area management unit configured to manage, as a set, a plurality of content items each corresponding to one of the first display objects stored in the same area.

5. The content management apparatus according to claim 1, wherein the area is capable of displaying the first object contained in the area.

6. The content management apparatus according to claim 1, wherein, when the second display object is moved into the area in response to the instruction received by the instruction receiving unit, the display control unit changes a display format of the area so that a user understands that a condition regarding movement of the first display object into the area or from the area is set.

7. The content management apparatus according to claim 1, wherein, when the second display object is moved into the area in response to the instruction received by the instruction receiving unit, the control unit performs control so that movement of the first display object into the area or from the area is not allowed.

8. The content management apparatus according to claim 7, wherein the display control unit changes a display format of the area into or from which movement of the first object is not allowed by the control unit so that a user understands that the movement of the first object is not allowed and the user examines information regarding the first display object contained in the area.

9. The content management apparatus according to claim 1, wherein, when the second display object is moved into the area in response to the instruction received by the instruction receiving unit, the control unit performs control so that movement of the first display object having particular property information into or from the area is not allowed.

10. The content management apparatus according to claim 1, wherein the instruction instructing the movement is realized through a drag-and-drop operation using one of a pointing device and a touch panel.

11. A method for managing content, comprising:
    performing control so that a first display object representing a content item, an area that contains the first display object, and at least one of a plurality of second display objects to define a function property of the area, the second display object used for setting a condition regarding movement of the first display object into the area or from the area are displayed on a display unit;

a position inputting unit configured to receive an input of a position in a display screen of the display unit;

receiving a drag operation;

controlling, in a case where the first display object is displayed at the position which is being input by the position inputting unit when a start of the drag is received by the instruction receiving unit, the first display object is dragged and, in a case where the second display object is displayed at the position which is being input by the position inputting unit when a start of the drag is received by the instruction receiving unit, the second display object is dragged; and performing control so that, if the first display object is dragged and moved into the area from outside the area and is dropped on the area, the first object is contained in the area and, if the second display object is dragged and moved into the area from outside the area, and is dropped on the area, a condition regarding movement of the first display object into the area or from the area displayed on the display unit is set, wherein the plurality of second display objects includes a second display object having a function property of prohibition conditions associated with classification, and a second display object having a function property of prohibition conditions associated with tag of the first display object.

12. A non-transitory computer-readable recording medium storing a program for causing a computer to function as:

a display control unit configured to perform control so that a first display object representing a content item, an area that contains the first display object, and at least one of a plurality of second display objects to define a function property of the area, the second display object used for setting a condition regarding movement of the first display object into the area or from the area are displayed on a display unit;

a position inputting unit configured to receive an input of a position in a display screen of the display unit;

an instruction receiving unit configured to receive a drag operation;

a drag control unit configured to perform control so that, in a case where the first display object is displayed at the position which is being input by the position inputting unit when a start of the drag is received by the instruction receiving unit, the first display object is dragged and, in a case where the second display object is displayed at the position which is being input by the position inputting unit when a start of the drag is received by the instruction receiving unit, the second display object is dragged; and a control unit configured to perform control so that, if the first display object is dragged and moved into the area from outside the area and is dropped on the area, the first object is contained in the area and, if the second display object is dragged and moved into the area from outside the area, and is dropped on the area, a condition regarding movement of the first display object into the area or from the area displayed on the display unit is set, wherein the plurality of second display objects includes a second display object having a function property of prohibition conditions associated with classification, and a second display object having a function property of prohibition conditions associated with tag of the first display object.

13. A content management apparatus comprising:

a processor;

a display control unit configured to perform control so that a first display object representing a content item, an area that contains the first display object, a third display object used for instructing processing to be performed on the content item corresponding to the first display object contained in the area, and at least one of a plurality of second display objects to define a function property of the area, the second display object used for setting a condition regarding movement of the third display object into the area or from the area are displayed on a display unit;

a position inputting unit configured to receive an input of a position in a display screen of the display unit;

an instruction receiving unit configured to receive a drag operation;

a drag control unit configured to perform control so that, in a case where the first display object is displayed at the position which is being input by the position inputting unit when a start of the drag is received by the instruction receiving unit, the first display object is dragged, and in a case where the third display object is displayed at the position which is being input by the position inputting unit when a start of the drag is received by the instruction receiving unit, the third display object is dragged and in a case where the second display object is displayed at the position which is being input by the position inputting unit when a start of the drag is received by the instruction receiving unit, the second display object is dragged; and a control unit configured to perform control so that, if the first display object is dragged and moved into the area from outside the area and is dropped on the area, the first object is contained in the area and, if the third display object is dragged and moved into the area from outside the area and is dropped on the area, the processing is performed on a content item corresponding to the first display object contained in the area, and, if the second display object is dragged and moved into the area from outside the area and is dropped on the area, a condition regarding movement of the third display object into the area or from the area displayed on the display unit is set, wherein the plurality of second display objects includes a second display object having a function property of prohibition conditions associated with classification, and a second display object having a function property of prohibition conditions associated with tag of the first display object.

14. A method for managing content, comprising:

performing control so that a first display object representing a content item, an area that contains the first display object, a third display object used for instructing processing to be performed on the content item corresponding to the first display object contained in the area, and at least one of a plurality of second display objects to define a function property of the area, the second display object used for setting a condition regarding movement of the third display object into the area or from the area are displayed on a display unit;

a position inputting unit configured to receive an input of a position in a display screen of the display unit;

receiving a drag operation;

a drag control unit configured to perform control so that, in a case where the first display object is displayed at the position which is being input by the position inputting unit when a start of the drag is received by the instruction receiving unit, the first display object is dragged, and in a case where the third display object is displayed at the position which is being input by the position inputting unit when a start of the drag is received by the instruction receiving unit, the third display object is dragged and in a case where the second display object is displayed at the position which is being input by the position inputting unit when a start of the drag is received by the instruction receiving unit, the second display object is dragged; and performing control so that, if the first display object is dragged and moved into the area from outside the area and is dropped on the area, the first object is contained in the area and, if the third display object is dragged and moved into the area from outside the area and is dropped on the area, the processing is performed on a content item corresponding to the first display object contained in the area, and, if the second display object is dragged and moved into the area from outside the area and is dropped on the area, a condition regarding movement of the third display object into the area or from the area displayed on the display unit is set, wherein the plurality of second display objects includes a second display object having a function property of prohibition conditions associated with classification, and a second display object having a function property of prohibition conditions associated with tag of the first display object.

15. A non-transitory computer-readable recording medium storing a program for causing a computer to function as:

a display control unit configured to perform control so that a first display object representing a content item, an area that contains the first display object, a third display object used for instructing processing to be performed on the content item corresponding to the first display object contained in the area, and at least one of a plurality of second display objects to define a function property of the area, the second display object used for setting a condition regarding movement of the third display object into the area or from the area are displayed on a display unit;

a position inputting unit configured to receive an input of a position in a display screen of the display unit;

an instruction receiving unit configured to receive a drag operation;

a drag control unit configured to perform control so that, in a case where the first display object is displayed at the position which is being input by the position inputting unit when a start of the drag is received by the instruction receiving unit, the first display object is dragged, and in a case where the third display object is displayed at the position which is being input by the position inputting unit when a start of the drag is received by the instruction receiving unit, the third display object is dragged and in a case where the second display object is displayed at the position which is being input by the position inputting unit when a start of the drag is received by the instruction receiving unit, the second display object is dragged; and a control unit configured to perform control so that, if the first display object is dragged and moved into the area from outside the area and is dropped on the area, the first object is contained in the area and, if the third display object is dragged and moved into the area from outside the area and is dropped on the area, the processing is performed on a content item corresponding to the first display object contained in the area, and, if the second display object is dragged and moved into the area from outside the area and is dropped on the area, a condition regarding movement of the third display object into the area or from the area displayed on the display unit is set, wherein the plurality of second display objects includes a second display object having a function property of prohibition conditions associated with classification, and a second display object having a function property of prohibition conditions associated with tag of the first display object.

* * * * *